APPARATUS FOR LOADING A COACH BODY INTO A PICK-UP TRUCK

Original Filed Sept. 25, 1959 2 Sheets-Sheet 1

INVENTOR.
ARCHIE A. PETERSON
BY Mallinckrodt and Mallinckrodt
ATTORNEYS

APPARATUS FOR LOADING A COACH BODY INTO A PICK-UP TRUCK

Original Filed Sept. 25, 1959 2 Sheets-Sheet 2

INVENTOR.
ARCHIE A. PETERSON
BY Mallinckrodt and Mallinckrodt
ATTORNEYS

United States Patent Office

Re. 25,443
Reissued Sept. 10, 1963

25,443

APPARATUS FOR LOADING A COACH BODY INTO A PICK-UP TRUCK

Archie Albert Peterson, 213 S. 3rd West St., Sandy, Utah

Original No. 3,074,576, dated Jan. 22, 1963, Ser. No. 842,438, Sept. 25, 1959. Application for reissue Feb. 25, 1963, Ser. No. 260,934
4 Claims. (Cl. 214—515)

Figure 1:
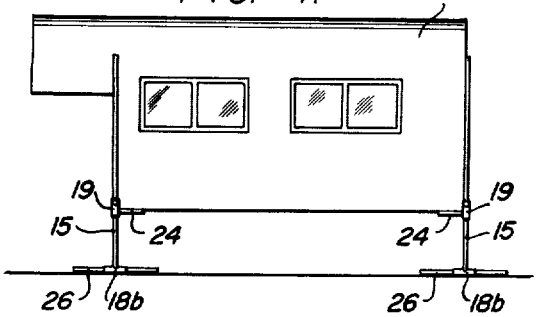

Matter enclosed in heavy brackets [ ] appears in the original patent but forms no part of this reissue specification; matter printed in italics indicates the additions made by reissue.

This invention relates to lifting jack apparatus for loading and unloading purposes, and is particularly concerned with apparatus of this type for loading a coach body into the receiving bed of a pick-up truck and for unloading it when desired.

Coach bodies are being used extensively in connection with pick-up trucks for a variety of purposes. They provide compact living quarters for travel, and are highly regarded by sportsmen for fishing and hunting expeditions. They are often used by artisans as traveling workshops or for storing tools and supplies.

It has always been difficult to load the heavy coach body into the receiving bed of the pick-up truck and to unload it when a trip has been completed and it is desired to use the truck for other purposes. Various systems of jacks have been developed, but these have not proven satisfactory. It is not safe to raise or lower the coach, unless there is a person at each jack so that all the jacks may be worked simultaneously. This, of course, limits the usefulness of such systems. Even then there is a tendency for one or more of the jacks to bind, unless great care is exercised to work all four jacks in synchronism.

A principal object of this invention is to provide lifting jack apparatus, in connection with a coach body to be loaded into and unloaded from a pick-up truck, which will permit limited lifting or lowering of the coach (two to three inches) at any one of its corners at a time by one person, or less limited lifting or lowering (twelve to eighteen inches) at a set of two corners at a time at either end of the coach by two persons, without jeopardizing coach support.

Another object is to provide such lifting jack apparatus with sufficient give when elevated to permit swinging of the coach to either side a limited distance (one to two inches) to accommodate inaccurate spotting of the truck under the load.

A feature in the accomplishment of these objects is the provision of lifting arms and sockets of cylindrical configuration, so one will turn relative to the other during the loading and unloading operations, and the arrangement of such lifting arms and sockets with their longitudinal axes extending at right angles to the longitudinal axis of the coach, whereby lifting of one end of the coach will cause the other end to pivot about the longitudinal axis of the arms and sockets at that end as centers, and vice versa.

An important companion feature is the provision of an elongate, narrow foot for each jack, which extends at right angles to the lifting arm thereof and preferably has a rounded bottom, so the jack is stabilized longitudinally of the coach but can swing inwardly or outwardly about the longitudinal axis of such foot as a center when a jack at the opposite side of the coach is raised or lowered.

I am aware of Clark U.S. Patents Nos. 1,122,686 and 1,303,854 granted December 29, 1914 and May 20, 1919, respectively, for transport trucks utilizing lifting jack systems for loading and unloading a truck body relative to a truck chassis from which it is separable. In neither instance, however, do the lifting arms and receiving sockets pivot during the loading and unloading operations, or do the feet of the jacks provide longitudinal stabilization or pivotal movement of the jack standards. While the later Clark patent discloses cylindrical lifting arm and socket structure appropriately oriented for the present purpose, such structure is so constructed and arranged as to be rigidly held against pivotal movement during loading and unloading operations. Its pivotal properties are useful only in connection with the swinging of the jacks into out-of-the-way storage positions on the truck body.

Still another feature of this invention is the provision of a spring latch arrangements between arm and socket for each jack, whereby the jack is securely latched to the coach during raising or lowering thereof without interfering with pivotal movement between arm and socket. This latching arrangement is advantageously so made as to be easily unlatched by rotating the lifting arm in its socket beyond what is normal during loading and unloading of the coach body.

A specific embodiment of lifting jack apparatus, which is presently regarded as the best mode of carrying out my invention, is illustrated in the accompanying drawings in connection with a standard type of coach body and pick-up truck.

Figure 4:
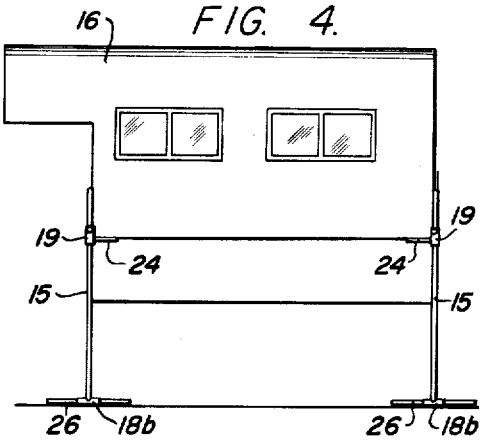
Figure 5:
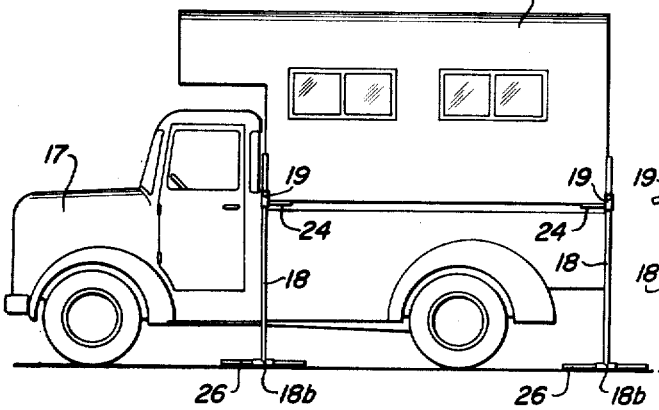
Figure 6:
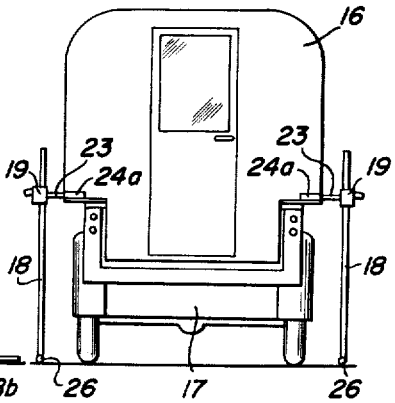
Figure 7:
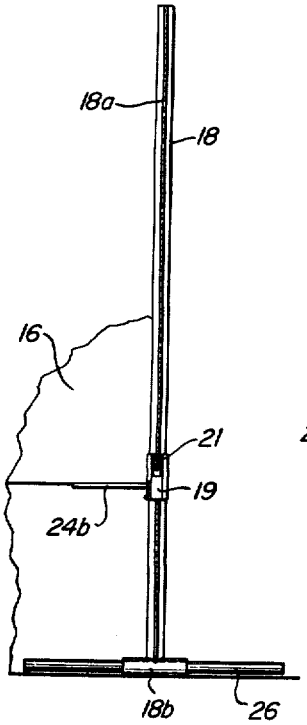
Figure 8:
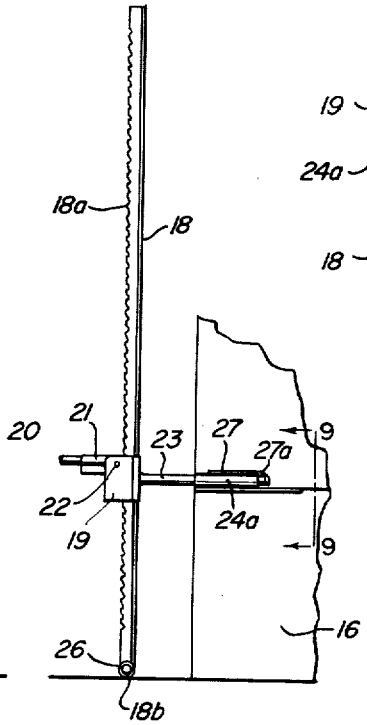
Figure 9:
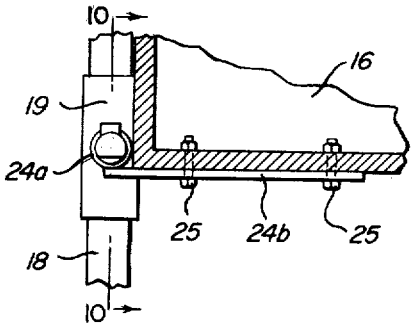
Figure 10:
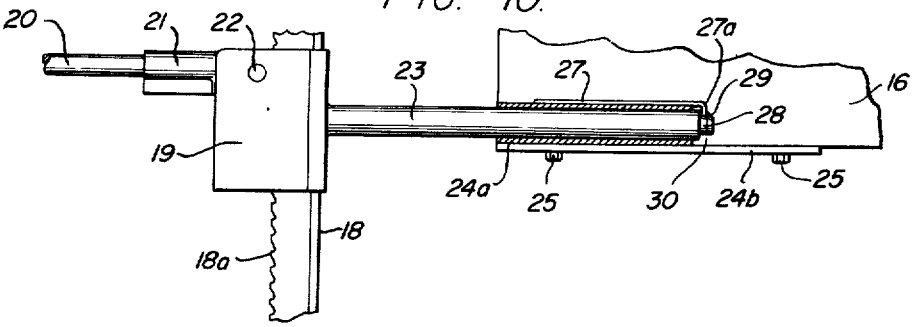

In the drawings:

FIGS. 1 to 4, inclusive, are schematic representations of a coach body and the lifting jack apparatus of the invention in side elevation at various stages in the lifting of the coach by two persons from a position on the ground to an elevated position in which a pick-up truck can be backed into coach-receiving position;

FIG. 5, a view corresponding to that of FIG. 4, but showing the pick-up truck in coach-receiving position;

FIG. 6, a rear end view of the coach and truck in the position of FIG. 5;

FIG. 7, a fragmentary view, drawn to a considerably enlarged scale, showing the rear end portion of FIG. 1;

FIG. 8, an end elevation of the structure shown in FIG. 7, looking from the right in FIG. 7;

FIG. 9, an enlarged, fragmentary, vertical section taken on the line 9—9 of FIG. 8;

FIG. 10, a partial vertical section taken on the line 10—10 of FIG. 9; and

Figure 11:
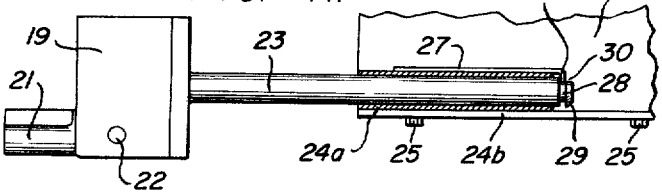

FIG. 11, a similar view taken after the jack standard has been removed from the traveler and the latter rotated to unlatched position for removal of the lifting arm from its socket.

Figure 2:
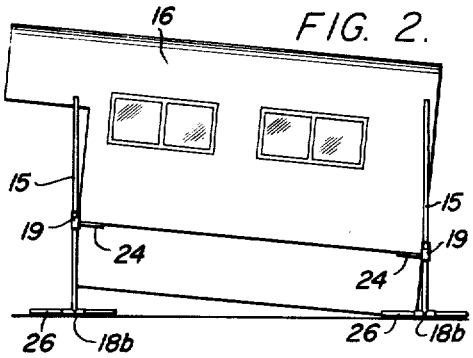
Figure 3:
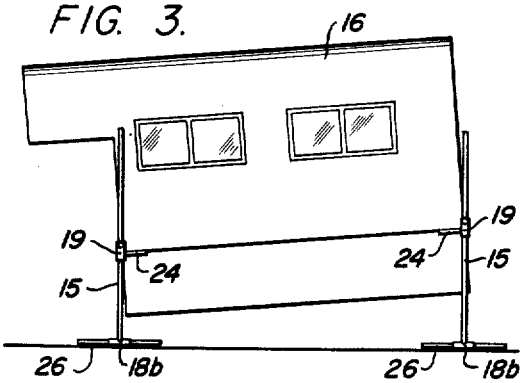

Referring to the drawings:

The illustrated lifting jack apparatus comprises four individual jacks 15 for lifting or lowering respective corners of a standard type of coach body 16 relative to the receiving bed of a standard pick-up truck 17. When the coach 16 is raised from a resting place on the ground or other storage area, see FIG. 1, through successive stages, as indicated in FIGS. 2 and 3, to the level shown in FIG. 4, the truck 17 may be backed into the position of FIG. 5, whereupon slight lowering of the jacks will transfer the load to the truck. Unloading of the coach body from the truck is accomplished in similar manner with the procedure just reversed.

I prefer to employ the type of jack illustrated, which is an adaptation of the well known bumper jack customarily furnished as standard equipment with modern automotive vehicles. As such, each jack includes a standard 18 of T-shaped cross section and unusually great length, with the free edge of the stem of the T notched in ratchet formation 18a. A traveler 19 rides upwardly or downwardly on the standard 18 in customary sequential increments when a removable jack handle 20, FIGS. 8 and 10, is worked up and down to reciprocate handle socket 21 about the customary pivotal center 22. A double pawl mechanism (not shown) of customary type is operatively disposed within traveler 19 for cooperative action in the usual manner with ratchet 18a when the handle 20 is manually worked.

An elongate, cylindrical, lifting arm 23 projects backwardly from rigid securement to the back of traveler 19, for insertion in and concentric, freely pivotal relationship with an elongate socket member 24a of a lift fixture 24. There is a set of four of such lift fixtures, each of which includes a flat plate portion 24b for attachment in any suitable manner, as by means of bolts 25, FIG. 9, to the underside of the coach body 16 adjacent to the respective corners thereof.

While the lift fixtures may be fabricated and attached in various ways, it is preferred in most instances that the socket member 24a of each be a length of pipe welded or otherwise suitably secured to one face of the plate 24b along one margin thereof, see FIG. 9, so as to project laterally of the coach body, rather than to form an undesirable projection depending from the coach bottom to interfere with proper seating of the coach on truck and storage areas.

The standard 18 of each jack is provided with an elongate and narrow foot at its lower end, extending at right angles to lifting arm 23 at opposite lateral sides of the standard. While it is important in most instances that the foot be longer than the here illustrated foot portion 18b of standard 18, it is highly desirable that the extra length be provided only at the time of use, so the carrying and storage of the jacks do not offer problems. Accordingly, it is a feature of the invention that the foot portion 18b of standard 18 be a comparatively short length of pipe welded or otherwise suitably secured intermediate its length to the lower end of the standard proper, so that a separate length 26 of pipe or other rod-like material of outer diameter about equal to the inner diameter of the pipe foot portion 18b may be inserted thereinto to extend its length appropriately. I have found a satisfactory length for foot portion 18b in most instances to be six inches and a satisfactory length for insert pipe 26 to be thirty inches.

In order to facilitate a slight rocking motion of standards 18 about the longitudinal axes of their respective feet as centers, to accommodate lateral or transverse tipping of the coach body during the lifting and lowering thereof and when spotting an elevated coach body over an inaccurately positioned truck, it is advantageous that the feet be rounded at their bottoms transversely of and along their lengths. Pipe or other cylindrical material is therefore admirably adapted to provide the feet for the standards.

Latching means between respective sets of lifting arm and receiving socket are advantageously provided as a safety measure. These are desirably spring latches, which snap into latched position as the arms are pushed home into the sockets, and it is highly desirable that they be capable of being unlatched quickly and easily.

For this purpose, it is a feature of the invention that a spring latch be secured to each socket, preferably overhanging its inward end which is open for the projection therethrough of the free end of the lifting arm, and that a keeper be appropriately provided on the lifting arm, preferably on the aforesaid projecting fore end thereof. In the preferred form illustrated, an elongate, flat spring 27, FIG. 10, extends longitudinally of socket member 24a, outwardly thereof, and has one end 27a overhanging the open, inner end of such socket member and bent inwardly as a latch, and the other end secured, as by welding, to the socket member.

The free end portion of lifting arm 23 is grooved circumferentially adjacent to its tip, as at 28, FIG. 10, and its tip is beveled circumferentially, as at 29. The groove 28 serves as a keeper for latch 27a, while the beveled end 29 enables latch 27a to ride up and over into groove 28 when the lifting arm is pushed completely through its socket 24a.

For enabling quick and easy release of latch 27a, it is a feature of the invention that groove 28 extend only about the upper portion of lifting arm 23, and that the lower portion be ungrooved, as by grinding off the lower part of the end portion of such lifting arm after a completely circumferential groove has been machined, see 30.

When the lifting or lowering operation has been completed by either one person or two persons working together, each jack is removed for storage by working the jack mechanism to lift standard 18 above ground level sufficiently to permit rotation thereof, along with traveler 19 and its projecting lifting arm 23, relative to socket member 24a and the coach body 16, through an arc great enough to permit complete withdrawal of such standard from its traveler. Thereafter, rotation of the traveler and its lifting arm is continued until latch 27a rests upon the ungrooved or flattened part 30 of the lifting arm, whereupon such lifting arm becomes unlatched, and can be withdrawn from its socket.

Whereas there is here illustrated and described a certain preferred construction which I presently regard as the best mode of carrying out my invention, it should be understood that various changes may be made without departing from the inventive concepts particularly pointed out and distinctly claimed hereinbelow.

I claim:

1. In lifting jack apparatus for loading and unloading a substantially rectangular body of a vehicle with respect to the chassis and running gear from which it is separable, said apparatus including four lift fixtures adapted for attachment to said body adjacent its corners, respectively, and four lifting jacks [of elongate ratchet type], each having a standard provided with [a] stabilizing foot *means*, a lifting arm projecting from said standard for engagement with one of said lift fixtures, and means for raising and lowering said lifting arm with respect to said standard by successive increments, the lifting arm being of cylindrical configuration and projecting horizontally from its standard and each lift fixture including a socket of cylindrical configuration for receiving a lifting arm in concentric, pivotal relationship, the improvement comprising a freely pivotal relationship between lifting arm and socket of each cooperating set of jack and lift fixture in the loading and unloading positions of said jacks, the several cooperating sets of jack and lift fixtures being structurally and functionally independent of one another; and means for securely latching the lifting arm of each jack in its freely pivotal relationship with its socket.

2. The improved apparatus of claim 1, wherein the foot of each jack is elongate and extends at right angles to the lifting arm of the jack of which it forms a part.

3. The improved apparatus of claim 1, wherein the latch means comprises a spring latch mounted on the lift fixture and a keeper formed at the end of the lifting arm, said keeper having an open-ended groove extending around the upper portion of the circumference of the lifting arm adjacent to its free end, the lower portion of said circumference being flattened.

4. Vehicle body and lifting apparatus therefor, comprising a coach body adapted to rest in the bed of a pick-up truck; a set of four lift fixtures attached to the corners, respectively, of said coach body, each of said lift fixtures including plate means fastened to the bottom of said coach body and a socket member of cylindrical configuration for receiving a lifting arm in concentric, pivotal relationship, said socket member being secured to the outer edge portion of said plate means and extending along an end of said coach body at a corner thereof substantially against an end wall of said coach body and above the level of said plate means and of said bottom of the coach body; a set of four lifting jacks [of elongate ratchet type], each having a standard provided with [a] stabilizing foot *means*, a lifting arm projecting from said standard horizontally, and means for raising and lowering said lifting arm with respect to said standard by successive increments, said lifting arm being of cylindrical configuration; and latch means carried by the respective sets of lift fixtures and lifting arms, for maintaining said lifting arms within their respective sockets and in freely pivotal relationship therewith during the loading and unloading of said coach body.

References Cited in the file of this patent or the original patent

UNITED STATES PATENTS

| | | |
|---|---|---|
| 1,122,686 | Clark et al. | Dec. 29, 1914 |
| 1,303,854 | Clark | May 20, 1919 |
| 1,440,016 | Kimmerle et al. | Dec. 26, 1922 |
| 2,173,076 | Stetson | Sept. 12, 1939 |
| 2,555,336 | Hagely | June 5, 1951 |
| 2,823,010 | Baxendell | Feb. 11, 1958 |
| 2,868,401 | Le Lois | Jan. 13, 1959 |
| 2,995,397 | Eames | Aug. 8, 1961 |

FOREIGN PATENTS

| | | |
|---|---|---|
| 456,259 | Great Britain | Nov. 5, 1936 |